United States Patent [19]

Andersson

[11] Patent Number: 4,971,093
[45] Date of Patent: Nov. 20, 1990

[54] CHECK VALVE

[76] Inventor: Bo A. Andersson, Flomatic Corporation, North Hoosick, N.Y. 12133

[21] Appl. No.: 479,513
[22] Filed: Feb. 13, 1990
[51] Int. Cl.⁵ ............................................. F16K 15/06
[52] U.S. Cl. ................................... 137/541; 137/542; 137/543.21
[58] Field of Search .................... 137/541, 542, 543.21

[56] References Cited

U.S. PATENT DOCUMENTS

| | | | |
|---|---|---|---|
| 1,242,706 | 10/1917 | Loetzer | 137/541 X |
| 1,976,849 | 10/1934 | Hewitt | 137/543.21 |
| 2,719,055 | 9/1955 | Lauck | 137/541 X |
| 2,736,338 | 2/1956 | Britton | 137/541 X |
| 2,960,998 | 11/1960 | Sinker et al. | 137/542 |
| 3,145,724 | 8/1964 | Pelzer | 137/543.21 X |
| 4,129,144 | 12/1978 | Andersoon et al. | 137/541 |

Primary Examiner—John Rivell
Attorney, Agent, or Firm—Charles R. Fay

[57] ABSTRACT

In a check valve wherein a possible malfunction resides in a thread pipe end being seat too far into the valve housing in a position to make a contact with the movable head or poppet of the valve and thus undesirably close the valve, vanes are provided in certain locations on the head or poppet that will themselves to contact the pipe end under pressure conditions and provide flumes for the fluid to flow through, in spite of the condition stated.

3 Claims, 1 Drawing Sheet

CHECK VALVE

BACKGROUND OF THE INVENTION

This invention constitutes an improvement on the kind of valve shown in U.S. Pat. No. 4,129,144, dated Dec. 12, 1978 and other like valves having the equivalent of the head or poppet shown at 30 therein. It has been found that at times the pipe end that is set into the chamber that the head is in will be allowed to closely engage the head and in effect close the valve altogether by mistake. This invention provides a simple inexpensive structure that permanently prevents such malfunction. No part of the valve need be changed, only the head referred to, which in this case is shown domed.

SUMMARY OF THE DISCLOSURE

In order to illustrate the invention, it is shown herein as similar to the valve structure shown in the U.S. Pat. No. 4,129,144, but the application of the invention is not limited to this particular valve and will be found to be of value in other valves. The domed head, which of course may be so shapes other than merely domed, is provided with outstanding fins that prevent insertion of the adjacent pipe to a degree where in the leading (circular) pipe edge cannot contact the head per se even at full opening of the valve, thereby ensuring the free passage of fluids at all times except when the valve is closed to prevent all flow. One single vane or fin can accomplish this desired result, but it is preferred to distribute the pressure on the head by using e.g. three mutually spaced radial fins all alike and in essence, covering the head but allowing fluid passage at all times.

The pre-threaded pipes used are normally made so that the pipe cannot enter the valve body far enough to cause closure of the valve itself. It is the possibility of closure of the valve by contact of the inner extreme end of the pipe against the movable head or poppet of the check valve that is prevented by this invention.

PREFERRED EMBODIMENT OF THE INVENTION

Figure 1:
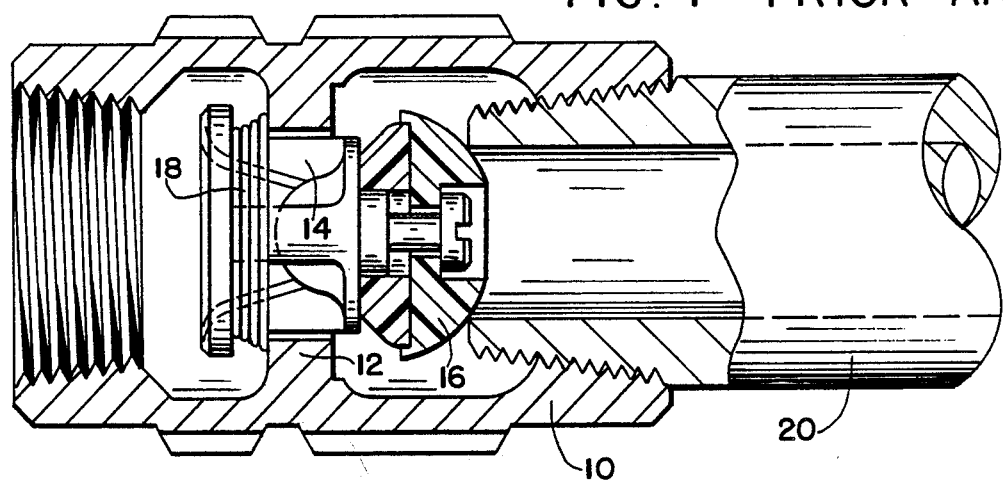
FIG. 1 is a sectional view through the body of a prior art valve, illustrating a possible unwanted closure of the valve due to the head or poppet of the valve contacting the adjacent pipe to which the housing of the valve is connected.

In FIG. 1, the valve is shown as a well-known check valve, generally described in U.S. Pat. No. 4,129,144. A housing 10 is threaded at each end for insertion in a pipe line or the like and it has an internal circular guide 12 open centrally for the flow of a fluid left to right. This guide slidingly accommodates the guide or stem 14 of a valve assembly having a domed head or poppet 16 to one side of guide 12 and is spring-biassed as at 18 at the other side of the guide 12. As well known, the pressure of the fluid flowing normally left to right holds the valve open but a reverse flow will close the valve. If the pipe 20 at the downstream, right hand end of the housing should happen to extend too far into the housing, the head or poppet 16 may contact the extreme inner end of this pipe and close the valve under normal or higher pressures. The dome of the head or poppet and the pipe are of course circular and make a fit.

Figure 2:
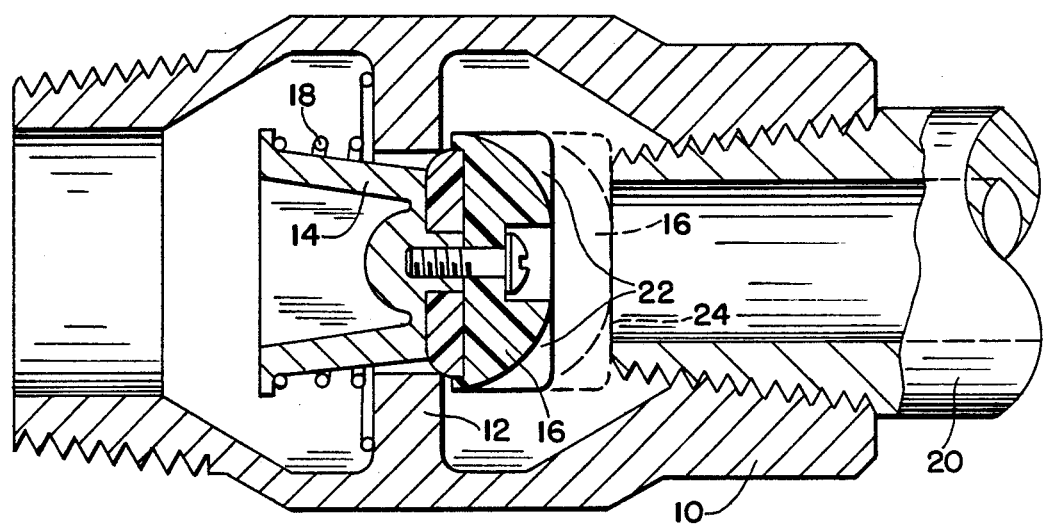
FIG. 2 is a view similar to FIG. 1, but illustrating the present invention.
Figure 3:
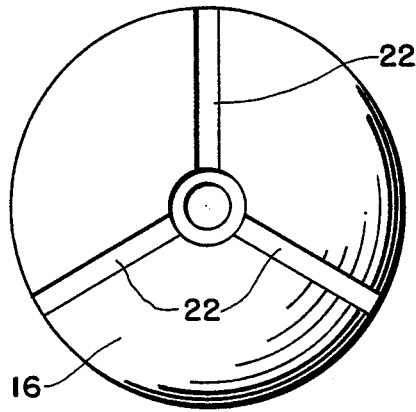
FIG. 3 is an elevational view of the valve head or poppet with the vanes of the present invention in place.
Figure 4:
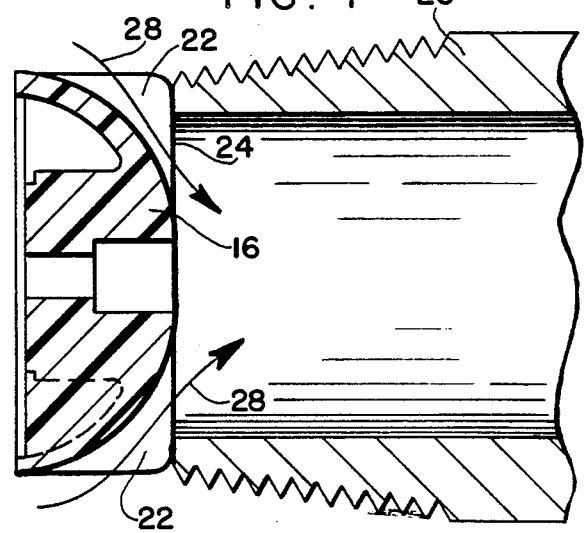
FIG. 4 is a diagram on an enlarged scale showing the effect of the invention on the valve flow.

The present invention includes the provision of vanes 22 extending in mutually circumferential spaced relations in a radial pattern with these planes parallel to the valve and pipe 20 and thus parallel to the water flow. Should the head or poppet thus contract the inner end of pipe 20, flow passages for the fluid will still exist between vanes, as will be apparent from an inspection of FIG. 2. If, but only if the inner end 24 of pipe 20 should be located too far inwardly of the valve, there will be a line closure that would be circular and complete in the prior art FIG. 1, but the invention still provides fluid flow between the novel vanes, across the dome of the head or poppet, see the curved arrows 28 in the diagram, FIG. 4.

As shown in the drawing, the outside diameter of head 16 is in excess of the interior diameter of pipe 20, and thus this head cannot in any event enter the pipe, but can abut it in the prior art but is prevented from doing so by the vanes 22. In other words, the inside of the pipe 20 is less than the outside diameter of the head 16. The head 16, on the other hand, finds a seat provided by guide 12 against which the head is held in conditions of no pressure, by elastomeric means spring 18. When pressure exists, by reason of fluid flowing downstream, the pressure on guide or stem 14 forces the head off this seat and opens the valve. As the vanes 22 approach the inner end of pipe 20, the flow is restricted, but cannot be shut off. As clearly seen in FIG. 4 the vanes conform in shape to the curved surface of the dome 16 at corresponding edges, and have other corresponding edges in a plane to contact the edge 24 of pipe 20 simultaneously.

I claim:

1. A valve comprising a housing, a valve seat and valve guide therein, a movable valve member and a stem thereon in the valve guide, a head on the stem at one side of the seat, the head and stem being movable relative to the guide to close the valve against the seat or selectively to open the valve for fluid flow, a pipe connected to the housing in the path of the valve, the head on the valve stem having a diameter at least as great as the inside diameter of the pipe, so that in the event that the head could contact the end of the pipe, when fully open, the flow of fluid to the pipe could be cut off, a series of vanes on the head facing the pipe to engage the pipe and stop further motion of the valve toward the pipe, said vanes having a significantly lesser area than the valve head and thus ensuring a fluid flow even though the valve head is positioned as close to the pipe end as possible, said vanes being separate with relation to each other and mutually spaced in radial positions on the head, said vanes having corresponding free edges in a plane and together span the diameter of the pipe.

2. A check valve comprising a housing, a valve seat therein, and an on-or-off valve associated with the seat, said valve including elastomeric means, a head, means mounting the head for motion to and from the seat to close the valve and away from the seat to open the valve, said elastomeric means tending to maintaining the head closed on the seat, in closed condition of the valve, means on the valve housing to admit pipe to be secured to the housing in position to allow a flow of fluid material, past the head, and an extension on the head of less diameter than the head and in the path of the pipe extended into the valve housing to be intercepted by the pipe and prevent the valve head from impinging directly on the pipe end, whereby the pipe fails to form a closure between pipe and valve head, the extension comprising a vane on the head, the vane having a plane parallel to the fluid flow in the valve, another like vane on the head circumferentially spaced from the first named vane, the vanes extending substantially the diameter of the domed head, and the effective lengths of the vanes are at least as great as the inside diameter of the pipe.

3. The valve of claim 2 wherein the valve head is domed at one side, presenting the domed side of the valve to the pipe end, the inside diameter of the pipe end being less than the diameter of the head.

* * * * *